(12) United States Patent  (10) Patent No.: US 9,182,265 B1
Ward  (45) Date of Patent: Nov. 10, 2015

(54) LIQUID LEVEL DETECTION DEVICE

(71) Applicant: Diversitech Corporation, Duluth, GA (US)

(72) Inventor: Charles Barry Ward, Merritt Island, FL (US)

(73) Assignee: Diversitech Corporation, Duluth, GA (US)

( * ) Notice: Subject to any disclaimer, the term of this patent is extended or adjusted under 35 U.S.C. 154(b) by 306 days.

(21) Appl. No.: 13/709,227

(22) Filed: Dec. 10, 2012

Related U.S. Application Data

(60) Provisional application No. 61/583,339, filed on Jan. 5, 2012.

(51) Int. Cl.
*G01F 23/26* (2006.01)
*G01F 25/00* (2006.01)

(52) U.S. Cl.
CPC .............. *G01F 23/26* (2013.01); *G01F 23/265* (2013.01); *G01F 23/266* (2013.01); *G01F 25/0061* (2013.01)

(58) Field of Classification Search
CPC . G01F 23/265; G01F 23/266; G01F 25/0061; G01F 23/26
USPC .................................. 73/290 R, 304 R, 304 C
See application file for complete search history.

(56) References Cited

U.S. PATENT DOCUMENTS

| | | | | |
|---|---|---|---|---|
| 5,069,074 A * | 12/1991 | Young et al. | .............. | 73/861.356 |
| 7,432,725 B2 * | 10/2008 | Sieh et al. | ...................... | 324/662 |
| 7,509,856 B1 * | 3/2009 | Winkens et al. | ............. | 73/304 C |
| 2002/0031324 A1 * | 3/2002 | Cao et al. | ...................... | 385/140 |
| 2003/0200801 A1 * | 10/2003 | Lipscomb et al. | ........... | 73/290 V |
| 2005/0022595 A1 * | 2/2005 | Eguchi et al. | ............... | 73/304 R |
| 2010/0071459 A1 * | 3/2010 | Kamm et al. | ............... | 73/304 C |
| 2011/0290014 A1 * | 12/2011 | Kato et al. | .................. | 73/304 R |

* cited by examiner

*Primary Examiner* — Hezron E Williams
*Assistant Examiner* — David Z Huang
(74) *Attorney, Agent, or Firm* — Smith Gambrell & Russell LLP

(57) ABSTRACT

A liquid level detection device includes a signal source for generating one or more unique signals on low impedance signal electrodes, a lock-in amplifier, and a reference signal directly connecting the signal source to the lock-in amplifier. The unique signals generated by the signal source are connected to one or more low impedance signal electrodes. The low impedance signal electrodes may be positioned at different levels inside the tank so that at any given level of liquid in the tank, each low impedance individual electrode may or may not be in contact with the liquid in the tank. Alternatively, the low impedance signal electrodes may be attached to the external wall of the tank at different levels. An antenna is connected to an input of the lock-in amplifier. The antenna may be placed inside the tank at the lowest level for the liquid, or the antenna may be attached to the outside wall of the tank near the bottom of the tank.

9 Claims, 4 Drawing Sheets

PRIOR ART

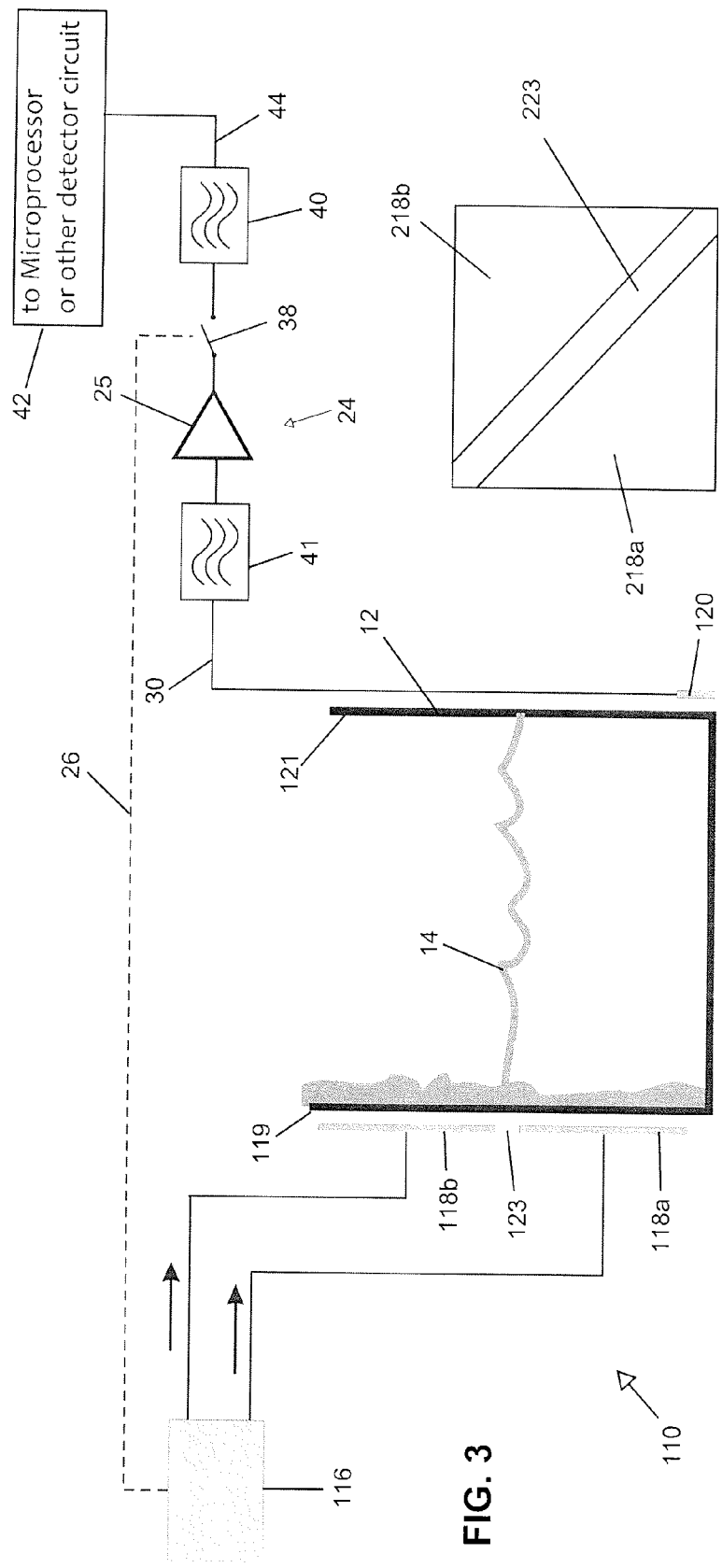

LIQUID LEVEL DETECTION DEVICE

CROSS REFERENCE TO RELATED PATENT APPLICATIONS

This invention claims priority from U.S. Provisional Patent Application No. 61/583,339, filed Jan. 5, 2012, which is hereby incorporated by reference.

FIELD OF THE INVENTION

This invention relates to a liquid level detection device and more particularly relates to a liquid level detection device that includes low impedance signal electrodes and a lock-in amplifier for determining the level of liquid in a tank or other liquid storage vessel.

BACKGROUND OF THE INVENTION

Liquid handling systems generally require a means for determining the level of a liquid in a tank or other liquid storage vessel. One such liquid handling system is a condensate pump for use with a heating, ventilation, and air-conditioning (HVAC) system. A conventional condensate pump has a tank or reservoir for collecting condensate from the evaporator of the HVAC system. A centrifugal pump transfers the condensate from the tank to a remote location for disposal. In a simplified embodiment of the condensate pump, the operation of the centrifugal pump is controlled by a control circuit, which turns on the centrifugal pump when the liquid level in the tank has reached a certain level and turns off the centrifugal pump when the centrifugal pump has emptied the tank. Control functions for the condensate pump may also include sounding an alarm or shutting off the HVAC system when an emergency overflow level of condensate is reached in the tank of the condensate pump. Therefore, a liquid level detection device is necessary to detect the level of liquid in the tank in order to control the operation of the centrifugal pump, an alarm, or the continued operation of the HVAC system.

In order to determine the liquid level in the tank of a conventional condensate pump, a float is often used to monitor and detect the water level in the tank. In response to movement of the float in the tank, associated float switches and a float control circuit control the operation of the electric motor driving the impeller of the centrifugal pump, trigger alarms, or shut down the HVAC system if necessary. The condensate pump float is in contact with the water in the tank and is subject to fouling from debris and algae buildup. A molded float has seams, which may fail causing the float to sink or malfunction. The float switch that is used to control the on/off operation of the electric motor is often a specialized and costly bi-stable snap-action switch. A conventional condensate pump, which incorporates a safety HVAC shut off switch and/or an alarm switch in addition to the motor control switch, may have a separate float or linkage to operate the HVAC shutoff switch or the alarm switch further complicating the condensate pump. Further, a conventional condensate pump often requires a float mechanism retainer to prevent shipping damage, and the float mechanism retainer must be removed prior to pump use.

The prior art also includes capacitive sensors to sense the level of the water in the tank of the condensate pump to control the operation of the pump motor, to trigger alarms, or to shut down the HVAC system if necessary. In one conventional capacitive water level sensor, at least one of the capacitance plates of the capacitive sensor is in contact with the water in the tank in order to produce a detectable change in capacitance as the water contacts or exposes the capacitance plate. Capacitance plates that are in contact with the water in the tank are subject to fouling based on the buildup of debris or algae. The fouling of the capacitance plate adversely affects the performance of the capacitive sensor.

Prior art capacitance sensors are bi-directional in nature. Sensing plates or electrodes are connected to an oscillator circuit, an RC or LC timing circuit (where the C capacitive component varies in relation to the proximity between the sensed fluid and the sensor plate), or other circuit arrangement which facilitates the measurement of timing or frequency by forcing a change of charge onto or off of the sensor plate or electrode and measuring the time required to reach a certain threshold potential or oscillation frequency. In order to build capacitance sensors of a reasonably small scale the resultant capacitance values typically range between a few and a few hundred picofarads and therefore require circuitry with high sensitivity and high input impedance. These high impedance circuits work well to detect water and other fluids, but due to their sensitive nature are subject to minute leakage currents created by dirty insulators, slime and mineral buildup in the vicinity of the sensing electrodes. A high impedance sensor may also fail from buildup which functions to connect it to an adjacent sensor. Additional failure modes can occur from stray radio frequency fields, electrostatic buildup and other outside electromotive forces which can easily influence the high impedance capacitive sensor input.

In another prior art capacitive sensor, the capacitance plates are mounted outside of the tank and not in contact with the water in the tank. In order to sense accurately the water level, such prior art external capacitive sensors have a first capacitance plate extending the height of the tank and one or more additional capacitance plates position at anticipated transition points along the height of the tank in order to determine when the water level has reached one of the transition points. Such additional capacitance plates are deemed necessary in order to offset the effects of deposits that may form on the inside of the tank adjacent to the external capacitance plates thereby affecting the capacitance value. Further, the capacitance plates of the capacitive sensors typically represent a high impedance inputs to the control circuit. Because of the high impedance, the capacitance plates pick up extraneous background interference that can further affect the accuracy of the capacitive sensors.

Yet another prior art sensor includes a sonic detector for determining the level water in the tank. Such a sonic detector includes a sonic generator that emits a sound wave from above the water toward the water. The sonic detector further includes a receiver for receiving the echoed sonic wave as the sound wave bounces off of the water in the tank. By measuring the time between the transmission of the sonic wave and the reception of the echoed sonic wave, the water level in the tank may be determined. Such sonic detectors are difficult to calibrate and may be affected by extraneous sound waves such as those created by the pump motor.

SUMMARY OF THE INVENTION

In order to sense the level of liquid in the tank and thereby control the operation of the motor of the centrifugal pump, an alarm, or shut off the HVAC system if necessary, a liquid level detection device is employed that can reject false signals common to electronic liquid level detection systems, which false signals are caused by contamination of the sensing electrode and the containment tank and by external electrical noise sources. The level detection device of the present invention includes an electronic signal source for generating one or more signals (multi-phase or multi-frequency), a lock-in amplifier, and a reference signal directly connecting the signal source to the lock-in amplifier. The signals generated by the signal source are connected to one or more low impedance signal electrodes. The low impedance signal electrodes may be positioned at different levels inside the tank so that at any given level of liquid in the tank, each individual low impedance signal electrode may or may not be in contact with the liquid in the tank. Alternatively, the low impedance signal electrodes may be attached to the external wall of the tank at different levels. Because each signal electrode is connected to a low impedance signal source output, the signal electrode is low impedance and immune to the perils of the high impedance input typical of capacitance sensors. Particularly, because each level detecting signal is emitted from a low impedance output, a bridge of slime or debris between adjacent signal electrodes cannot conduct a false signal onto another level electrode (output) as can be the case with high impedance capacitive or conductance sensors where the level detection electrode is at any time used as an input. This use of low impedance outputs for the signals is significant even without the added noise rejection and gain provided by a lock-in-amplifier.

An antenna is connected to an input of the lock-in amplifier. The use of the lock-in-amplifier with high gain and noise immunity allows the reception of signals that are weakened by adjacent grounded electrodes, metallic vessels, and other conductive components that may be in contact with the liquid inside the tank. The antenna may be placed inside the tank at the lowest level for the liquid and displaced from the low impedance signal electrodes, or the antenna may be attached to the outside wall of the tank near the bottom of the tank and displaced from the low impedance signal electrodes.

In one embodiment, three low impedance signal electrodes are attached to the signal source and mounted inside the tank. The first low impedance signal electrode extends to near the bottom of the tank inside the tank, representing a low water level. The second low impedance signal electrode extends to a point midway point between the bottom and top of the tank, representing an intermediate water level. The third low impedance signal electrode extends to a point near the top of the tank, representing a critical high water level. The antenna is positioned inside the tank near the bottom of the tank and displaced from the low impedance signal electrodes.

In a second embodiment, two low impedance signal electrodes are attached to the signal source and are mounted outside of the tank on one of the walls of the tank. The first low impedance signal electrode extends vertically from near the bottom to approximate the midway depth of the tank, representing a range of water levels from a low water level to an intermediate water level. The second low impedance signal electrode extends vertically from the midway point of the tank to near the top of the tank, representing a range of water levels from the intermediate water level to a critical high water level. The antenna is positioned outside the tank near the bottom of the tank on a wall opposite from the low impedance signal electrodes.

Other configurations and arrangements of the low impedance signal electrodes may be used including low impedance signal electrodes mounted outside of the tank in a diagonal pattern and combinations of externally mounted an internally mounted low impedance signal electrodes and antennas.

In operation, the signal source produces a set of unique signals in a timed sequence on each of the low impedance signal electrodes. Each of the unique signals identifies a specific low impedance signal electrode connected to the signal source. The antenna connected to the lock-in amplifier receives the unique signals and connects the unique signals to the input of the lock-in amplifier. For a first unique signal on a first low impedance signal electrode, the signal source also produces a reference signal that is connected to the lock-in amplifier. The reference signal matches the phase and frequency of the emitted unique signal for the specific electrode being monitored. (FIG. 5). The reference signal is used to select an output from the antenna amplifier whose phase matches that of the reference, and therefore matches the phase and frequency of the emitted signal. Based on the phase of the reference signal's frequency the amplifier's true or complementary signal is routed in exact phase to an integrator. Only signals that match the phase of the reference signal exactly are added to the value accumulated by the integrator. Any signal received by the antenna whose phase does not exactly match that of the reference signal, whether it be from adjacent electrodes or an external electromagnetically generated source, are both positively and negatively integrated in matching proportions and are therefore neutralized. The integrator circuit produces an output that is proportional to the strength of the received first unique signal. The strength of the received first unique signal depends on whether the first unique signal is conducted through liquid in the tank or through air in the tank. From the strength of the received first unique signal, the lock-in amplifier can determine the water level in the tank with respect to the first low impedance signal electrode that is identified by the first unique signal.

In sequence, a second unique signal is produced by the signal source on the second low impedance signal electrode. Again, the reference signal produced by the signal source is connected to the lock-in amplifier to select the amplifier phase and thereby sample the received second unique signal while the second unique signal is present on the second low impedance signal electrode. Once the second unique signal terminates, the integrator output value is saved for later comparison, and the integrator is reset. Again, because the second unique signal identifies the specific second low impedance signal electrode, the lock-in amplifier can determine whether the second low impedance signal electrode is in contact with the water in the tank or not depending on the strength of the received second unique signal. Likewise, a third unique signal and a third low impedance signal electrode can be employed for determining a third level of water in the tank. Additional electrodes and unique signals may be employed to refine the measurement of the depth of the liquid in the tank.

Further objects, features and advantages will become apparent upon consideration of the following detailed description of the invention when taken in conjunction with the drawings and the appended claims.

BRIEF DESCRIPTION OF THE DRAWINGS

FIG. 3 is a schematic view of a liquid level detection device with low impedance signal electrodes mounted outside the tank and a lock-in amplifier in accordance with the present invention.

FIG. 4 is a schematic view of a pattern of low impedance signal electrodes for a liquid level detection device with the low impedance signal electrodes mounted outside the tank in accordance with the present invention.

DETAILED DESCRIPTION OF THE PREFERRED EMBODIMENT

Figure 1:
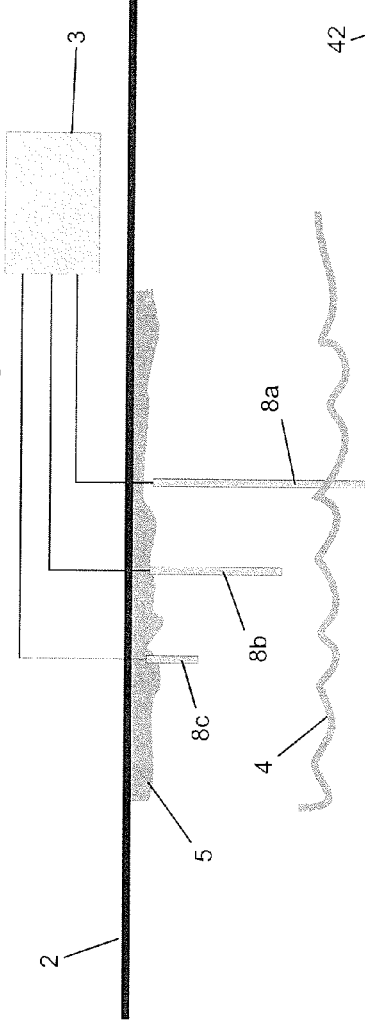
FIG. 1 is a schematic view of a prior art liquid level detection device in which capacitance plates are positioned at various levels inside a tank.

Turning to FIG. 1, a prior art capacitive liquid level detection device 1 is shown for detecting the level of liquid 4 in a tank 2. The prior art liquid level detection device 1 has one or more capacitance plates 8a, 8b, and 8c of different lengths that are connected to a microprocessor/capacitance detector 3. As the liquid 4 rises to contact the capacitance plates 8a, 8b, and 8c, the capacitance value for the individual capacitance plate changes. That change in capacitance value is detected by the microprocessor 3 thereby indicating the level of the liquid 4 in the tank 2. Over time, dirt, debris, algae, and other slime 5 can build up inside the tank 2 and on the capacitance plates 8a, 8b, and 8c. The build up of dirt, debris, algae, and other slime 5 causes the value of the capacitance to vary in an unpredictable fashion thereby compromising the accuracy of the liquid level detection device 1.

Figure 2:
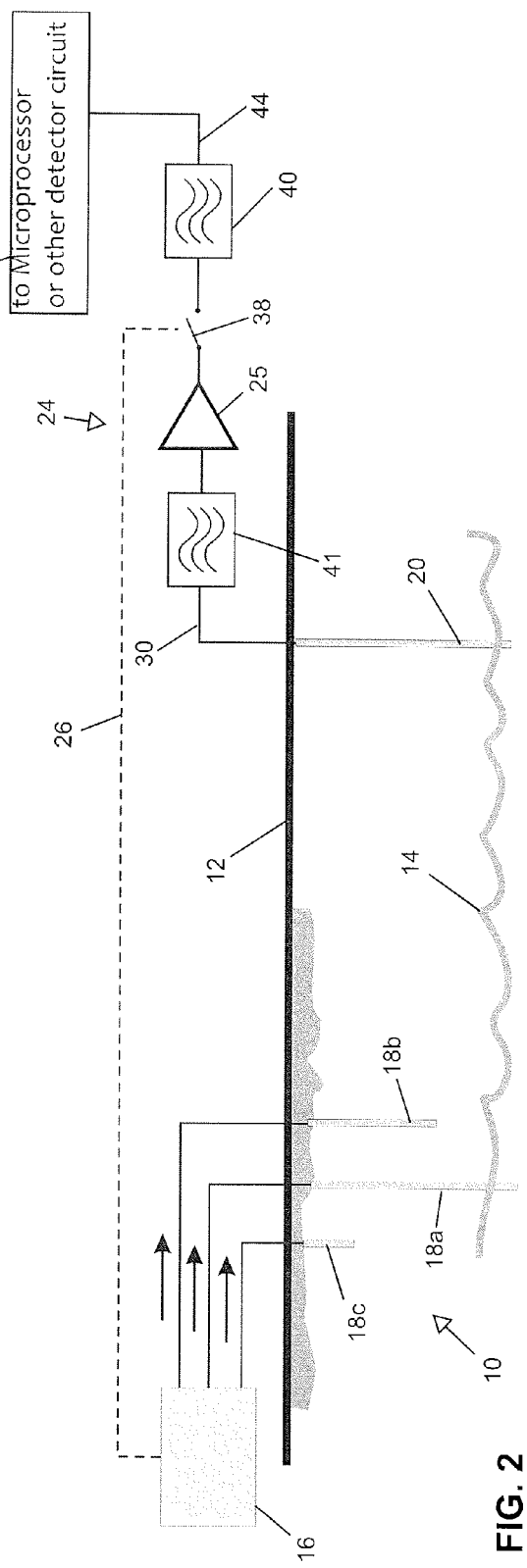
FIG. 2 is a schematic view of a liquid level detection device with low impedance low impedance signal electrodes mounted inside the tank and a lock-in amplifier in accordance with the present invention.

FIG. 2 discloses a first embodiment of a liquid level detection device 10 for detecting the level of liquid 14 in a tank 12 in accordance with the present invention. The liquid level detection device 10 comprises a signal source 16, a first low impedance signal electrode 18a (low water level), a second low impedance signal electrode 18b (intermediate water level), a third low impedance signal electrode 18c (critical high water level), an antenna 20, a sensing circuit comprising a lock-in amplifier 24, and a detector 42.

In accordance with the present invention, the term "low impedance" means that, by way of example, the signal electrodes are connected to a microcontroller output, a logic gate output, or other low-impedance solid-state output with an impedance in the range of 0 to 500 ohms and therefore significantly less apt to be perturbed than prior art level sensing electrodes that are capacitance sensors or signal inputs with typical input impedances in the range of 10,000 to Ser. No. 10/000,000 ohms. Further, in accordance with the present invention, the operation of the antenna 20 can be electrostatic, electro-magnetic, or conductive.

The low impedance signal electrodes 18a, 18b, and 18c are of different lengths and extend vertically into the tank 12 to different depths so that as the liquid 14 in the tank 12 rises, the liquid 14 sequentially contacts the signal electrodes 18a, 18b, and 18c. The signal source 16 generates a unique signal on each of the low impedance signal electrodes 18a, 18b, and 18c in sequence. The unique signals may be multi-phase or multi-frequency. By assigning different phases and/or frequencies to each signal generated by the signal source 16, the signal source 16 can create a large number of unique signals for use in connection with the liquid level detection device 10. The signal source 16 generates a first unique signal on the first low impedance signal electrode 18a for a first preselected time period. After the end of the first preselected time period for the first unique signal, the signal source 16 generates a second unique signal on the second low impedance signal electrode 18b for a second preselected time period. After the end of the second preselected time period for the second unique signal, the signal source 16 generates a third unique signal on the third low impedance signal electrode 18b for a third preselected time period. The preselected time periods may be the same value, or they may be different values. With the transmission of each of the unique signals, the signal source 16 transmits a reference signal 26 to control the operation of the lock-in amplifier 24 as will be described in greater detail.

With continuing reference to FIG. 2, the lock-in amplifier 24 comprises an input 30, an input filter 41, an amplifier 25, a sampling switch 38, an integrator 40, and an output 44. The output 44 of the lock-in amplifier 24 is connected to the detector 42. The input 30 is connected to the antenna 20. The antenna 20 is positioned in the tank 12, is displaced from the low impedance signal electrodes 18a, 18b, and 18c, and extends to the bottom of the tank 12 in order to contact the liquid 14 in the tank 12 during the entire time in which the liquid 14 rises and falls. The antenna 20 receives the unique signals generated by the signal source 16 on the low impedance signal electrodes 18a, 18b, and 18c. The received unique signal on line 30 is connected through an input filter 41 that is roughly tuned to the frequency of the unique signal. The amplifier 25 amplifies the received unique signal. The output of the amplifier 25 is connected to the integrator 40 by sampling switch 38. The operation of the sampling switch 38 is control by the reference signal 26 from the signal source 16.

In operation, the signal source 16 generates a first unique signal on the first low impedance signal electrode 18a for a first preselected time period. At the same time, the signal source 16 produces a reference signal 26 that closes the sampling switch 38 of the lock-in amplifier 24 for the first preselected time period. If the liquid 14 in the tank 12 is in contact with the low impedance signal electrode 18a, the antenna 20 will receive the first unique signal as the first unique signal passes through the liquid 14. The received first unique signal at the antenna 20 is connected to the lock-in amplifier 24 via input 30. The input filter 41 is tuned to the frequency of the first unique signal and passes the first unique signal through to the amplifier 25. Because the sampling switch 38 is closed, the amplified first unique signal is connected to the integrator 40, which produces an output signal on output line 44 that is proportional to the strength of the first unique signal received by the antenna 20 through the liquid 14. The detector 42 receives the output signal on line 44 and determines whether the strength of the output signal on line 44 is consistent with transmission of the first unique signal through the liquid 14 or consistent with the transmission of the first unique signal through air. Based on that determination, the detector 42 can determine whether the liquid 14 is in contact with the first signal electrode 18a.

The liquid level detection device 10 then repeats the process by transmitting a second unique signal on the second low impedance signal electrode 18b (intermediate water level) for a second preselected time period and by transmitting a third unique signal on the third low impedance signal electrode 18c (critical high water level) for a third preselected time period. In each case, the sampling switch 38, under the control of the reference signal 26, gates the received unique signal into the integrator 40 in order to generate an output signal on output line 44. Based on the value of the output signal on line 44, the detector 42 can determine whether the liquid 14 is in contact with either the second low impedance signal electrode 18b and/or the third low impedance signal electrode 18c. Based on the values of the output signal on line 44 for each of the unique signals generated by the signal source 16, the detector 42 can determine the level of the liquid 14 in the tank 12.

Because the lock-in amplifier 24 accepts only the generated unique signals while the sampling switch 38 is closed, the lock-in amplifier 24 rejects all of the signals received when the sampling switch 38 is open. Therefore, noise is rejected during the time that the sampling switch 38 is open. In addition, degradation of the unique signals, as a result of slime build up on the low impedance signal electrodes 18a, 18b, and 18c, does not adversely affect the performance of the lock-in amplifier 24.

FIG. 3 shows a second embodiment of a liquid level detection device 110 for determining the level of liquid 14 in the tank 12. The liquid level detection device 110 differs from the liquid level detection device 10 based on the arrangement of a first low impedance signal electrode 118a and a second low impedance signal electrode 118b and on the location of an antenna 120. The low impedance signal electrodes 118a and 118b are plates, and as shown in FIG. 3, the low impedance signal electrodes 118a and 118b are attached to the outside of a wall 119 of the tank 12. The antenna 120 is attached to the outside of an opposite wall 121 of the tank 12. The first low impedance signal electrode 118a extends across the width of the wall 119 and extends vertically from near the bottom of the tank 12 to a mid-point gap 123. The second low impedance signal electrode 118b extends across the width of the wall 119 and extends vertically from near the top of the tank 12 to the mid-point gap 123. The low impedance signal electrodes 118a and 118b are separated at the mid-point gap 123.

A signal source 116 is essentially the same as the signal source 16 except that the signal source 116 generates only two unique signals, a first unique signal for the first low impedance signal electrode 118a and a second unique signal for the second low impedance signal electrode 118b. As previously indicated, the unique signals may be multi-phase or multi-frequency. The signal source 116 generates a first unique signal on the first low impedance signal electrode 118a for a first preselected time period. After the end of the first preselected time period for the first unique signal, the signal source 116 generates a second unique signal on the second low impedance signal electrode 118b for a second preselected time period. With the transmission of each of the unique signals, the signal source 116 transmits a reference signal 26 to control the operation of the sampling switch 38 of the lock-in amplifier 24.

With continuing reference to FIG. 3, the lock-in amplifier 24 as previously described is connected to the antenna 120. The antenna 120 receives the unique signals generated by the signal source 116 on the low impedance signal electrodes 118a and 118b. The received unique signal on line 30 is connected through an input filter 41 that is roughly tuned to the frequency of the unique signal. The amplifier 25 amplifies the received signal. The output of the amplifier 25 is connected to the integrator 40 by the sampling switch 38. The operation of the sampling switch 38 is control by the reference signal 26 from the signal source 116 as previously described.

In operation, the signal source 116 first generates a first unique signal on the first low impedance signal electrode 118a for a first preselected time period. At the same time, the signal source 116 produces the reference signal 26 that closes the sampling switch 38 of the lock-in amplifier 24 for the first preselected time period. If the liquid 14 in the tank 12 is between the first low impedance signal electrode 118a and the antenna 120, the antenna 120 will receive the first unique signal as the first unique signal passes through the liquid 14. The received first unique signal at the antenna 120 is connected to the lock-in amplifier 24 via input 30. The input filter 41 is tuned to the frequency of the first unique signal and passes the first unique signal through to the amplifier 25. Because the sampling switch 38 is closed during the first preselected time period, the amplified first unique signal is connected to the integrator 40, which produces an output signal on output line 44 that is proportional to the strength of the first unique signal received by the antenna 120 through the liquid 14. The detector 42 receives the output signal on line 44 and determines whether the strength of the output signal on line 44 is consistent with transmission of the first unique signal through the liquid 14 or consistent with the transmission of the first unique signal through air. Based on that determination, the detector 42 can determine whether the liquid 14 is between the first low impedance signal electrode 118a and the antenna 120. Moreover, based on the strength of the output signal on line 44, the detector 42 can also determine how high the liquid 14 has risen along the vertical dimension of the first low impedance signal electrode 118a.

The liquid level detection device 110 then repeats the process by transmitting a second unique signal on the second low impedance signal electrode 118b for a second preselected time period. The sampling switch 38 under the control of the reference signal 26 from the signal source 116 gates the received second unique signal into the integrator 40 during the second preselected time period in order to generate an output signal on output line 44. Based on the value of the output signal on line 44, the detector 42 can determine whether the liquid 14 is between the second low impedance signal electrode 118b and the antenna 120. Moreover, based on the strength of the output signal on line 44, the detector 42 can also determine how high the liquid 14 has risen along the vertical dimension of the second low impedance signal electrode 118b.

Turning to FIG. 4, an alternate configuration for the low impedance signal electrodes used with the liquid level detection device 110 comprises low impedance signal electrodes 218a and 218b. The low impedance signal electrodes 218a and 218b are each triangular shaped plates with a gap 223 extending diagonally from a point near the top of the tank to a point near the bottom of the tank. The low impedance signal electrodes 218a and 218b are attached to the outside of the wall 119 (FIG. 3) of the tank 12. Because the signal transmitted through the liquid 14 from each of the low impedance signal electrodes 218a and 218b is proportional to the surface area of the triangle shaped low impedance signal electrode that faces the liquid in the tank, each of the triangular shaped low impedance signal electrodes 218a and 218b produces a proportional signal strength at the antenna 120 in FIG. 3. Therefore, as the liquid in the tank rises, the signal strength from the low impedance signal electrode 218a gradually increases as more of the surface area of the low impedance signal electrode 218a has liquid between the low impedance signal electrode 218a and the antenna 120. Similarly, the signal strength from the low impedance signal electrode 218b gradually increases as more of the surface area of the low impedance signal electrode 218b has liquid between the low impedance signal electrode 218b and the antenna 120. By comparing the signal strength at the output of the lock-in amplifier 24 for each of the low impedance signal electrodes, the depth of the liquid 14 in the tank 12 can be determined.

Figure 5:
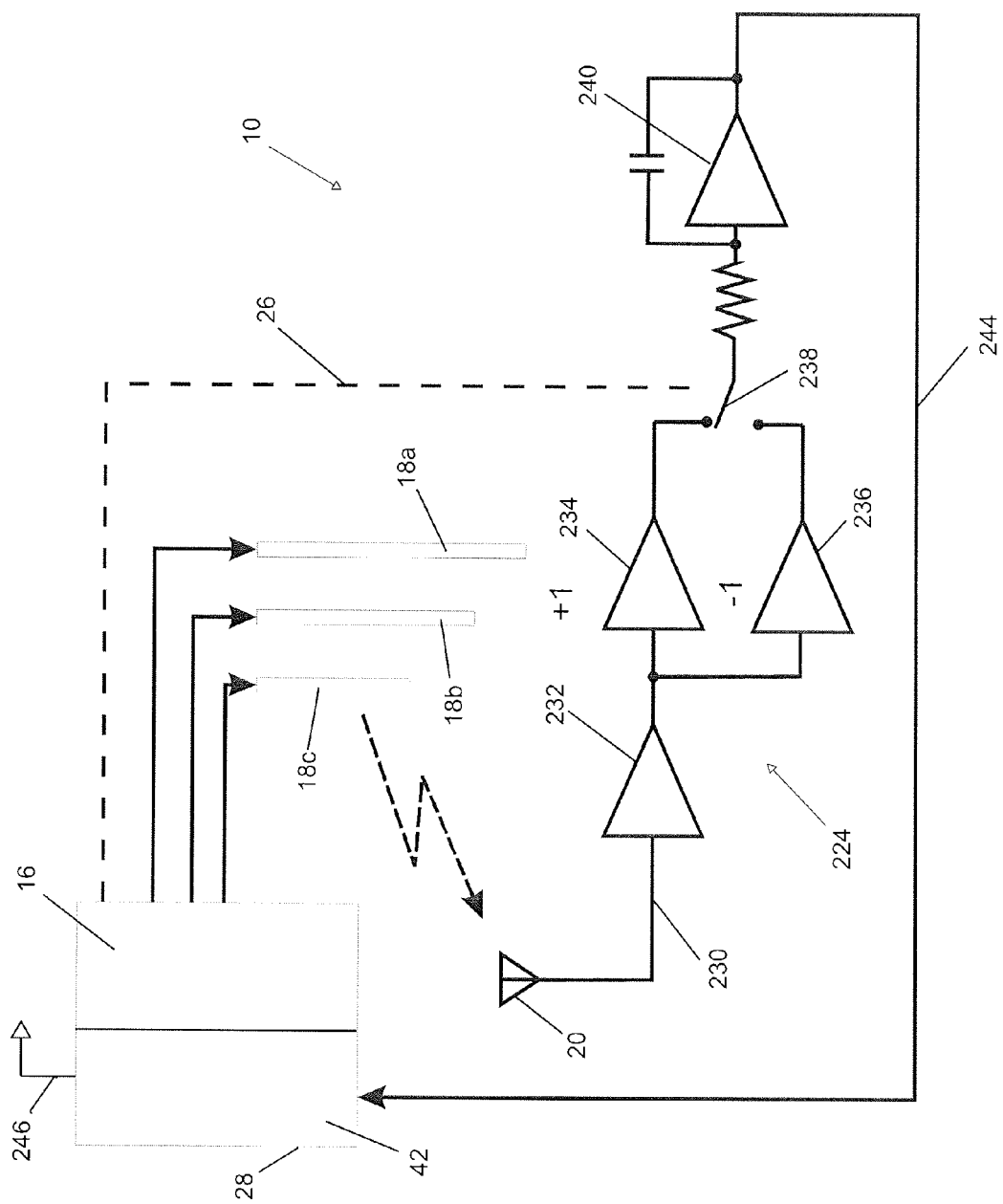
FIG. 5 is a schematic view of a liquid level detection device with low impedance signal electrodes and an alternative lock-in amplifier in accordance with the present invention.

Turning to FIG. 5, an alternative lock-in amplifier 224 is shown for the liquid level detection device 10 with the low impedance signal electrodes 18a, 18b, and 18c and the antenna 20 shown in FIG. 2. Particularly, the signal source 16 and the detector 42 are implemented by a microprocessor 28. The lock-in amplifier 224 comprises an input amplifier 232, a+1 amplifier 234, a−1 amplifier 236, a sampling switch 238, and an integrator 240. In operation, the signal source 16 generates a first unique signal on the first low impedance signal electrode 18a (low water level). The first unique signal is transmitted on the low impedance signal electrode 18a for a first preselected time period. The first unique signal is then received on the antenna 20. The strength of the received first unique signal received by the antenna 20 depends on whether the first low impedance signal electrode 18a is in contact with the liquid 14 in the tank 12. At the same time that the signal source 16 is transmitting the first unique signal on the first low impedance signal electrode 18a, the signal source 16 also transmits a reference signal 26 to the sampling switch 238 in the lock-in amplifier 10. The first unique signal at the antenna 20 is connected through the lock-in amplifier input 232 to the input amplifier 232. The output of the input amplifier 232 is connected to the inputs of the +1 amplifier 234 and the −1 amplifier 236. Depending on the polarity of the first unique signal, the reference signal 26 controls the sampling switch 238 to select either the output of the +1 amplifier 234 or the output of the −1 amplifier 236. For example, if the polarity of the first unique signal has a positive polarity, the sampling switch 238 selects the +1 amplifier 234. On the other hand, if the polarity of the first unique signal has a negative polarity, the sampling switch 238 selects the −1 amplifier 236. The selected output from the +1 amplifier 234 or the −1 amplifier 236 is connected to the integrator 240, which produces an output signal 244. Signals that do not match the phase and frequency of the reference signal 26 positively and negatively integrate to an average of zero and are therefore rejected. The output signal 244 is proportional to the strength of the first unique signal. The output signal 244 is connected to detector 42 of the microprocessor 28. Based on the strength of the output signal 244, the detector 42 then determines whether the first low impedance signal electrode 18a is in contact with the liquid 14 or not and uses that determination to generate a control signal 246 to control the operation of the pump motor.

Figure 6:
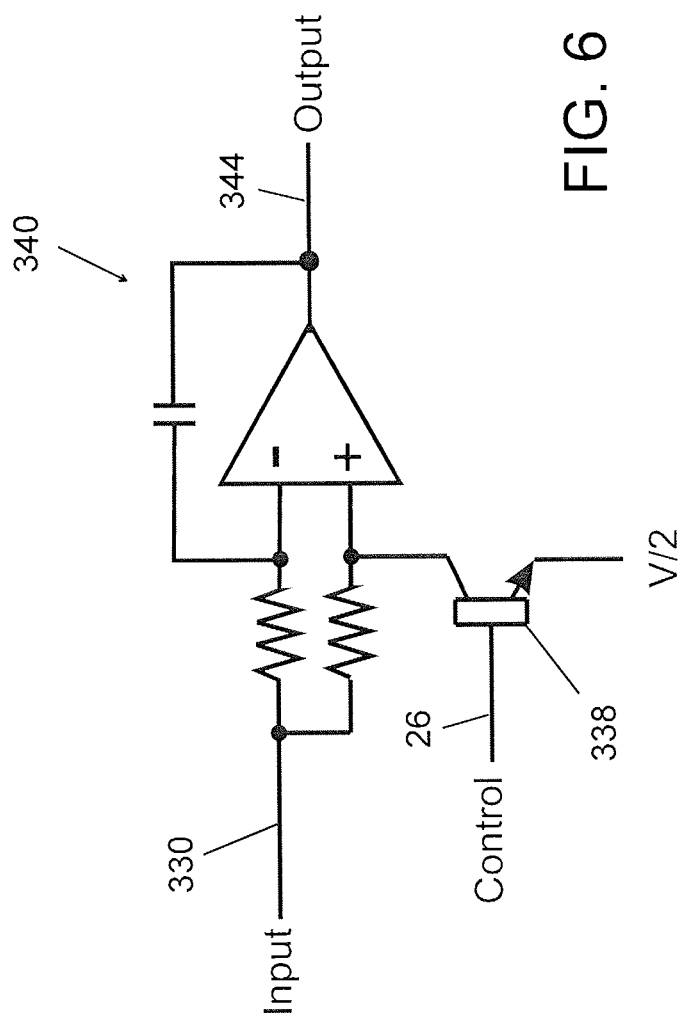
FIG. 6 is a schematic view of a selectable phase integrator for substitution into the liquid level detector shown in FIG. 5.

The liquid level detector 10 shown in FIG. 5 may also be implemented by using a selectable phase integrator 340, such as that shown in FIG. 6. The selectable phase integrator 340 is substituted for the integrator 240 in FIG. 5. Particularly, an input 330 of the selectable phase integrator 340 is connected to the antenna 20 shown in FIG. 5, and an output 344 of the selectable phase integrated 340 is connected to the detector circuit 42 of the microprocessor 28 shown in FIG. 5. The reference signal 26 is connected to a switch 338 that controls passage of the signal from the antenna 20 into the integrator 340.

While this invention has been described with reference to preferred embodiments thereof, it is to be understood that variations and modifications can be affected within the spirit and scope of the invention as described herein and as described in the appended claims.

I claim:

1. A liquid level detection device for detecting the level of liquid in a tank comprising:
 a. a plurality of low impedance signal electrodes located adjacent the tank, wherein each of the plurality of low impedance signal electrodes is located vertically with respect to each other;
 b. a signal source connected to the plurality of low impedance signal electrodes for generating a set of unique signals, each unique signal associated with one of the low impedance signal electrodes, wherein each low impedance signal electrode of the plurality of low impedance signal electrodes transmits the unique signal associated with that one low impedance signal electrode to the tank;
 c. an antenna located adjacent the tank and displaced from the plurality of low impedance signal electrodes for receiving the unique signals transmitted by the plurality of low impedance signal electrodes; and
 d. a sensing circuit connected to the antenna for receiving the unique signals from the antenna and for producing an output signal proportional to the liquid level in the tank for each of the plurality of low impedance signal electrodes.

2. The liquid level detection device of claim 1, wherein the signal source further generates a plurality of reference signals, the sensing circuit is a lock-in amplifier, and the reference signals are connected to the lock-in amplifier for controlling the lock-in amplifier to accept the unique signal and reject other signals received from the antenna.

3. The liquid level detection device of claim 1, wherein the low impedance signal electrodes are inside the tank.

4. The liquid level detection device of claim 3, wherein the antenna is inside the tank.

5. The liquid level detection device of claim 3, wherein the antenna is outside the tank.

6. The liquid level detection device of claim 1, wherein the low impedance signal electrodes are outside the tank.

7. The liquid level detection device of claim 6, wherein the antenna is inside the tank.

8. The liquid level detection device of claim 6, wherein the antenna is outside the tank.

9. The liquid level detection device of claim 1, wherein one or more of the low impedance signal electrodes are plates that are triangular in shape and separated from each other by a gap.

* * * * *